(12) United States Patent
Wittenstein

(10) Patent No.: US 10,114,860 B1
(45) Date of Patent: Oct. 30, 2018

(54) COMPUTERIZED CASE MANAGEMENT SYSTEM WITH AUTO-GENERATED MEMORABLE CASE IDENTIFIERS

(71) Applicant: EMC Corporation, Hopkinton, MA (US)

(72) Inventor: Andreas Wittenstein, Granada (ES)

(73) Assignee: EMC IP Holding Company LLC, Hopkinton, MA (US)

( * ) Notice: Subject to any disclaimer, the term of this patent is extended or adjusted under 35 U.S.C. 154(b) by 402 days.

(21) Appl. No.: 14/868,675

(22) Filed: Sep. 29, 2015

(51) Int. Cl.
*G06F 17/30* (2006.01)
(52) U.S. Cl.
CPC .. *G06F 17/30418* (2013.01); *G06F 17/30421* (2013.01); *G06F 17/30477* (2013.01); *G06F 17/30525* (2013.01); *G06F 17/30598* (2013.01)
(58) Field of Classification Search
CPC ................................................. G06F 17/30418
See application file for complete search history.

(56) References Cited

U.S. PATENT DOCUMENTS

| | | | | |
|---|---|---|---|---|
| 5,892,470 A * | 4/1999 | Kusnick | ............... | H03M 7/08 341/106 |
| 9,609,182 B1 * | 3/2017 | Millikan | ............... | H04N 5/225 |
| 2003/0070071 A1 * | 4/2003 | Riedel | ............... | G06F 21/6218 713/165 |
| 2007/0136691 A1 * | 6/2007 | Lance | ............... | G06F 3/048 715/827 |
| 2008/0172560 A1 * | 7/2008 | Hughes | ............... | H04L 9/3236 713/176 |
| 2008/0309960 A1 * | 12/2008 | Kinoshita | ............... | G06K 17/00 358/1.13 |
| 2009/0313269 A1 * | 12/2009 | Bachmann | ............... | G06F 21/645 |
| 2011/0314156 A1 * | 12/2011 | Ozzie | ............... | G06F 17/3012 709/226 |
| 2013/0151859 A1 * | 6/2013 | Riell | ............... | G06F 21/41 713/184 |
| 2013/0290383 A1 * | 10/2013 | Nitin | ............... | G06F 17/30097 707/822 |

* cited by examiner

Primary Examiner — Mahesh H Dwivedi
(74) Attorney, Agent, or Firm — BainwoodHuang

(57) ABSTRACT

A case management system includes a case database storing case records in association with respective internal case identifiers. Operation includes automatically generating memorable case identifiers and providing them to users for use in identifying respective case records, the memorable case identifiers being generated by encoding the internal case identifiers with respective user identifiers as respective sequences of words (e.g., 3-word sequences) of a natural language of the users according to an encoding function. Case records are retrieved from the case database and provided to the users based on memorable case identifiers received from the users, by decoding received memorable case identifiers into respective internal case identifiers and accessing the case database using the respective internal case identifiers from the decoding.

18 Claims, 3 Drawing Sheets

COMPUTERIZED CASE MANAGEMENT SYSTEM WITH AUTO-GENERATED MEMORABLE CASE IDENTIFIERS

BACKGROUND

The present invention is related to the field of computerized case management systems.

Some applications of case management systems may require human users to handle cases identified only by obscure identifiers, such as serial numbers or fingerprints, which the human users cannot easily distinguish, remember, recognize, or track. In some situations, for example when dealing with cases representing individual persons, more-memorable identifiers such as personal names may be withheld due to privacy concerns. In other situations, such as in scientific studies of cases involving non-human individuals (e.g., animals), no memorable identifiers may preexist. Moreover, in some situations, an individual case may be identified by any of a plurality of identifiers, each available in non-overlapping or only partially overlapping circumstances, thus multiplying the memorability difficulty for obscure identifiers. Examples include a set of 10 fingerprints of a subject; a set of IP addresses of a mobile web user moving from cell to cell; a patient's medical-chart numbers from different providers; or a chain of session identifiers assigned to a website visitor. Even if the individual identifiers are memorable, the linking of disparate identifiers itself introduces a memorability problem.

SUMMARY

A method is disclosed of operating a case management system having a case database storing case records in association with respective internal case identifiers. The method includes automatically generating memorable case identifiers and providing them to users of the case management system for use in identifying respective case records, the memorable case identifiers being generated by encoding the internal case identifiers along with respective user identifiers as respective sequences of words of a natural language of the users according to an encoding function, the sequences of words forming the memorable case identifiers. The method further includes retrieving case records from the case database and providing the case records to the users based on memorable case identifiers received from the users, the case records being retrieved by decoding received memorable case identifiers into respective internal case identifiers and accessing the case database using the respective internal case identifiers from the decoding.

The case records may be further associated with respective obscure identifiers visible to and used by the users of the case management system to identify respective case records to the case management system, and automatically generating memorable case identifiers may include capturing obscure identifiers provided by the users and translating captured obscure identifiers to corresponding internal case identifiers for use in the encoding.

Generating a memorable case identifier may include one or more of encrypting or hashing the internal case identifiers, with the inverse operations (decrypting/de-hashing) being performed in conjunction with decoding when accessing case records based on the memorable case identifiers. In another respect, generating a memorable case identifier may include resolving equivalence of multiple internal case identifiers to a single memorable case identifier and/or resolving equivalence of a single case identifier to multiple memorable case identifiers. Equivalence can support use cases such as case grouping (shared memorable case identifier) and information compartmentalization (multiple distinct memorable identifiers of different users mapping to a single internal identifier). The case management system may also receive and use feedback information to modify future operation based on past operation. Feedback information may include memorability information indicating a level of memorability of memorable case identifiers that have been automatically generated, the memorability information being used to alter the encoding operation to prefer words having characteristics correlated with higher memorability as identified by the memorability information.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

A system and method are disclosed for generating user-specific memorable aliases for obscure identifiers and equivalent identifiers, and in some embodiments for securely translating between user-specific aliases to enforce information-compartmentalization policies. In one embodiment, the aliases, referred to herein as "memorable case identifiers", are reversibly generated from a (digitized) input case-identifier and a user-identifier salt, via encryption and hashing, as short (e.g., 3-morpheme) phrases constructed from a simple small (e.g., 1000-word) user-specific vocabulary in the user's language, together with a user-appropriate grammar module and reduced by an equivalency resolver, where the hashing function is adjusted to the application's domain and range. An encoder may use a user-specific filter to adapt to the user's memory characteristics based on recognition timing, confusion rates, and direct feedback.

The system and method may be used to generate different memorable case identifiers for different users handling a case, to help thwart cross-compartment security breaches. In this case there is secure translation between the user-specific memorable case identifiers to enforce information-compartmentalization policies.

Figure 1:
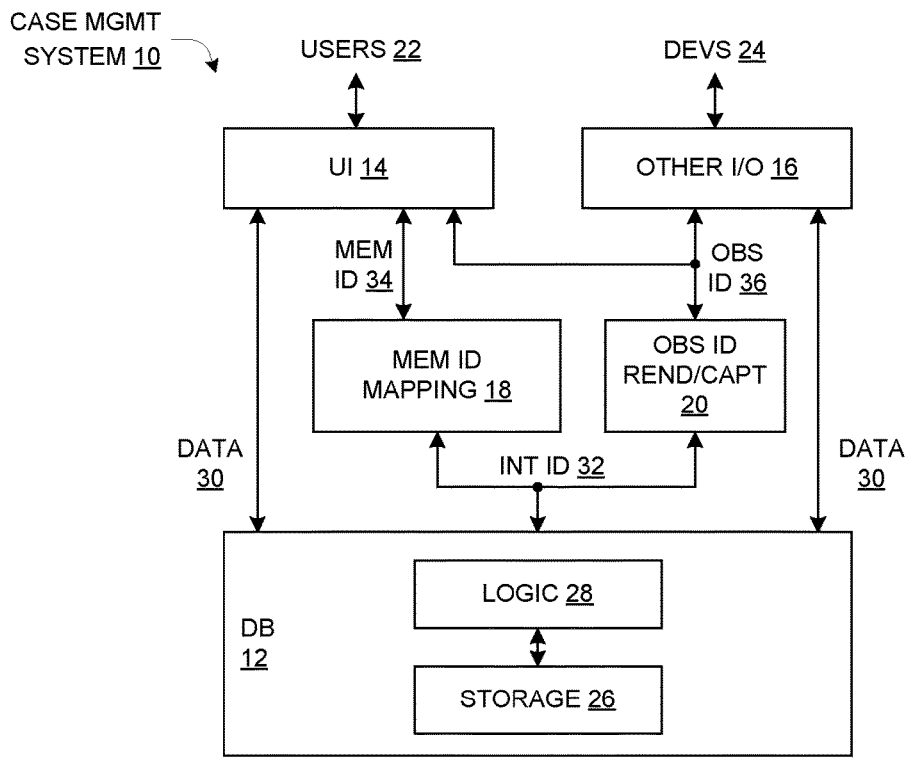
FIG. 1 is a block diagram of a case management system.

FIG. 1 shows a case management system 10, which can be realized as a computer system executing specialized computer programs or "software". Functional components of the system 10 include a database (DB) 12, a user interface (UI) 14, an other input/output interface (OTHER I/O) 16, a memorable identifier (MEM ID) mapping component 18 and an obscure identifier rendering and capture (OBS ID REND/CAPT) component 20. In the present description the acronym "ID" is used interchangeably with the term "identifier".

The user interface 14 provides for interaction with users 22, such as via a graphical display and input devices (keyboard, mouse, touchscreen input, etc.). In generally known fashion, the user interface 14 may include screens or pages having areas for displaying information to users 22 as well as other areas (e.g., text input areas, selection boxes, etc.) for receiving information from users 22. The other I/O interface 16 provides for I/O exchanges with other types of devices (DEVs) 24, such as storage devices, printers, scanners, etc. Example uses of such devices are given below.

The database 12 includes storage 26 and logic 28 for storing and retrieving database records to/from the storage 22 in response to corresponding storage and retrieval commands from the users 22. The database 12 exchanges data 30 with the user interface 14 and/or the other I/O interface 16. In a simple example, a user 22 may create a database record by entering data via the UI 14 and causing the entered data to be transferred into the database 12 as part of a new record. Also, a user 22 may view database records by causing their data contents to be transferred to the UI 14 for display. Other types of data transfer, such as transfers directly to/from data files, may be supported. Sets of records in the database 12 referred to herein as "cases" are uniquely identified or indexed by an internal case identifier, referred to herein as an internal identifier (INT ID), 32. Examples of cases include website users, patient medical records, offender criminal records, investigations, proceedings such as lawsuits, etc. The internal ID 32 in many cases is simply a numeric or alphanumeric value having little or no intrinsic meaning. If the database 12 is designed to store some maximum number of cases, for example, then the internal ID 32 may be simply a serial number having sufficient digits to enumerate all the cases that could be present. Sometimes a more complex structure may be used for various purposes. In general, it is assumed herein that the internal ID 32 is either not very memorable by regular users 22, and/or is not suitable for direct use by the users 22 for other reasons, including the above-mentioned information compartmentalization scenario.

The memorable ID mapping component 18 and obscure ID rendering/capture component 20 provide mappings or translations between the internal ID 32 and respective external IDs, which are referred to as a memorable ID (MEM ID) 34 and an obscure ID (OBS ID) 36 respectively. The obscure ID 36 is externally visible and usable (i.e., by users 22) but is assumed to be non-memorable. It may be some type of alphanumeric code, or it may be a graphical identifier such as a fingerprint, QR code, or bar code for example. The latter are examples of graphical encoding schemes employing graphical patterns as codes. Alternatively it might be a non-textual, non-graphical item such as an acoustic voice-print or chemical DNA sequence. The obscure ID rendering/capture component 20 has corresponding structure and functionality. In the case of a graphical obscure ID 36, the obscure ID rendering/capture component 20 typically includes a scanner and logic for translating a scanned image (serving as the obscure ID 36) into a corresponding digital representation used directly or indirectly as the internal ID 32. If the obscure ID 36 is an alphanumeric code, the obscure ID rendering/capture component 20 typically includes logic for mapping the alphanumeric code to the internal ID 32.

The memorable ID 34 is also externally visible and usable (i.e., by users 22) but is specifically designed to be memorable to the users 22 while also being able to individually identify a large number of cases and to avoid disclosing any information content of the cases (e.g., personally identifying information or PII). While several forms of such memorable IDs 34 are possible and contemplated by present disclosure, an example is presented in which the memorable IDs 34 are short sequences of words of a natural language (e.g., English) of the users 22. In one particular example, sequences of three words are used. As explained below, the words may be drawn from a vocabulary repository ("dictionary"), and the sequences may be constrained according to certain rules ("grammar"). Alternatively, a short sequence of pictures or pictograms, as in a rebus, may be employed. The memorable ID mapping component 18 has structure and functionality, described in detail below, for converting between values of the memorable ID 34 and corresponding values of the internal ID 32. It is assumed for ease of description that internal IDs 32 and obscure IDs 36 already exist for the cases in the database 12. Techniques for generating and using internal IDs 32 and externally visible obscure IDs 36 are generally known, and those skilled in the art will readily understand how to integrate such techniques with the memorable-ID techniques described herein.

Figure 2:
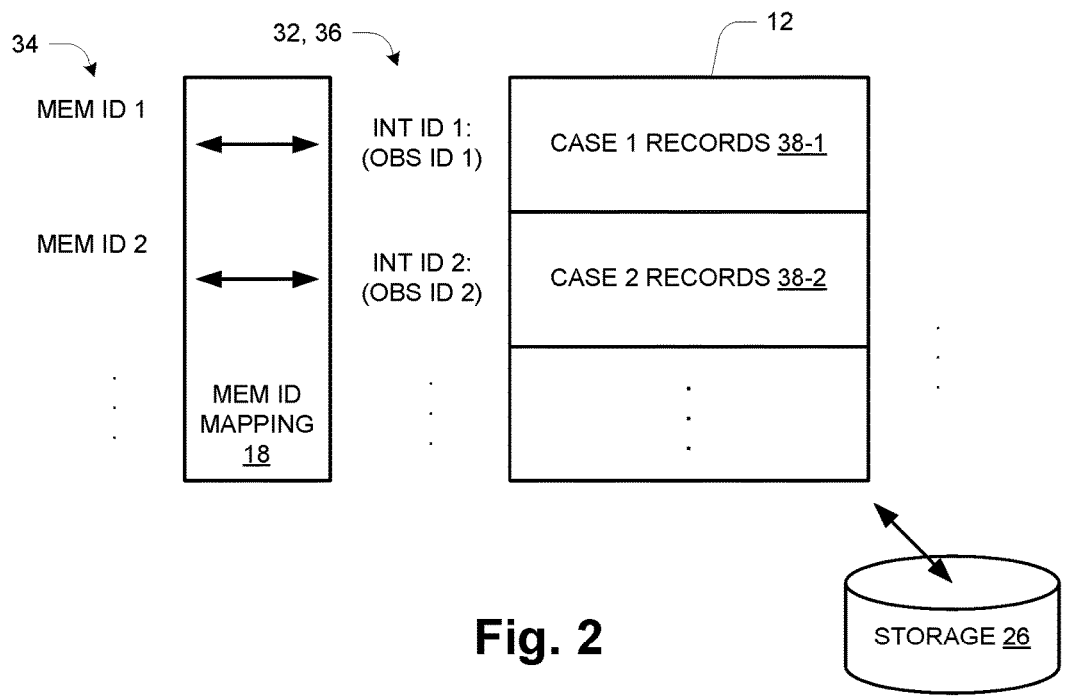
FIG. 2 is a schematic diagram of a mapping of identifiers in a case management system.

FIG. 2 is a schematic illustration of the database 12 and the various identifiers 32, 34 and 36. As shown, the database 12 includes sets of case records 38 (38-1, 38-2, . . . ) for respective cases shown as Case 1, Case 2, etc. Each set 38-i has a corresponding internal ID 32, i.e., INT ID 1 for case 1 records 38-1, INT ID 2 for case 2 records 38-2, etc. Generally each set 38-i also has a corresponding obscure identifier 36 as well. The memorable ID mapping component 18 associates the memorable IDs 34 to corresponding cases and their sets of records 38. FIG. 2 shows two memorable IDs 34, MEM ID 1 and MEM ID 2, which are mapped to INT ID 1 (Case 1) and INT ID 2 (Case 2) respectively. Depending on the application, there may be any of a 1:1, 1:n, m:1, and m:n relationship between the memorable IDs 34 and the internal IDs 32. In a 1:n relationship, one memorable ID 34 may identify multiple cases and thus be mapped to multiple internal IDs 32. This might be useful when cases are grouped and worked on as groups, for example. In an m:1 relationship, multiple memorable IDs 34 might map to a single case and thus be mapped to the same internal ID 32. This might be useful when individual cases are handled by different users 22, for example. These scenarios are enabled by support for equivalence, which is described more below. Both scenarios apply in an m:n relationship.

Figure 3:
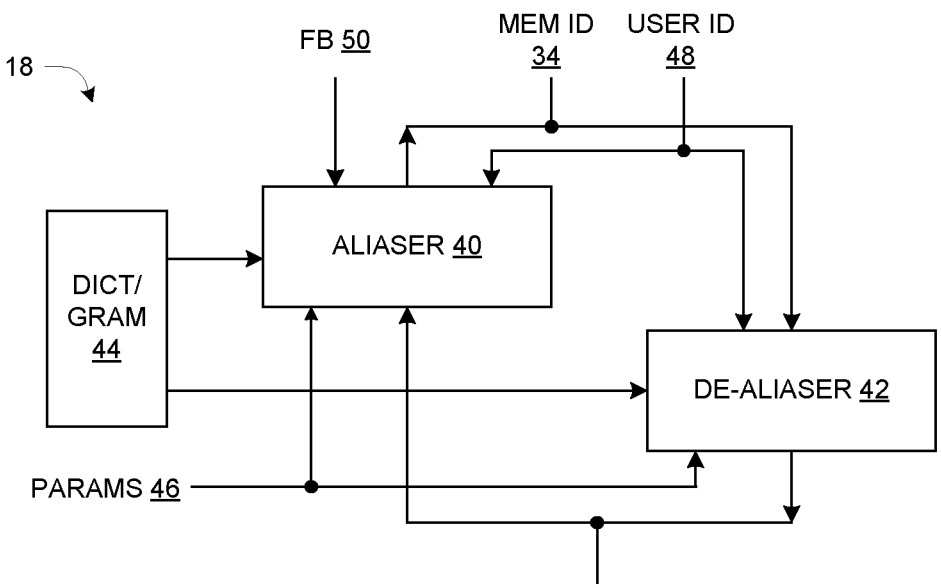
FIG. 3 is a block diagram of a memorable identifier mapping component.

FIG. 3 shows the structure of the memorable ID mapping component 18. It includes an aliaser 40, de-aliaser 42, and a dictionary/grammar component 44. The dictionary/grammar component 44 contains a set of words from which words are drawn to form the word sequences that make up the memorable IDs 32. The dictionary/grammar component 44 may also describe certain constraints or rules for the construction of word sequences, which may be viewed as a form of grammar. As an illustrative hypothetical example, words in the dictionary may be tagged with a "part of speech" identifier (noun, verb, etc.), and a simple rule might require that sequences be formed in the pattern noun-verb-noun. The aliaser 40 constructs the word sequences according to any such rules contained within the dictionary/grammar component 44. As shown, the aliaser 40 and de-aliaser 42 may receive parameters 46 that control aspects of operation. In one example, the parameters 46 specify the size of a hash value used within the aliaser 40 and de-aliaser 42.

FIG. 3 shows that for the aliaser 40, the internal ID 32 is an input and the memorable ID 34 is an output, whereas for the de-aliaser 42 the memorable ID 34 is an input and the internal ID 32 is an output. Referring back to FIG. 1, the aliaser 40 receives the internal ID 32 from the obscure ID rendering/capture component 20 and provides the memorable ID 34 to the UI 14 for presentation to a user 22. The de-aliaser 42 receives the memorable ID 34 from the user 22 via the UI 14 and provides the internal ID 32 to the database 12 to identify cases that are the subject of database operations.

In operation, a user 22 interacts with the aliaser 40 via the UI 14 (FIG. 1) to create a memorable ID 34 for a case. The user may identify the case to the system 10 by using the corresponding obscure identifier 36, such as a bar code or fingerprint for example. Referring to FIG. 1, the obscure ID rendering/capture component 20 generates the internal ID 32 for the case from the obscure ID 36 provided by the user. The user also provides a user identifier (USER ID) 48 that identifies the individual user. The aliaser 40 uses these values to automatically generate a corresponding word sequence. Assuming proper design, the word sequences from aliaser 40 are guaranteed to be unique to a desirably high probability, so that the probability of sequences being duplicated for different cases (termed a "collision") is desirably low. The aliaser 40 provides the generated sequence as the memorable ID 34 back to the user 22 via the UI 14. It may be preferred that the system not store the memorable IDs 34 in association with their respective cases, for example to promote security or other goals. Memorable IDs 34 can be regenerated at any time.

The user 22 can then use the memorable ID 34 to identify the corresponding case to the system, for example in conjunction with a request to view the case records via the UI 14. The user provides the memorable ID 34 as well as the user's user ID 48 to the de-aliaser 42 via the UI 14. The de-aliaser 42 performs essentially the inverse operation as that performed by the aliaser 40 to generate the corresponding internal ID 32, which is then supplied to the database 12 (FIG. 1) to access the corresponding case records 38 (FIG. 2) stored therein.

The aliaser 40 may receive information referred to as "feedback" (FB) 50 from the users 22 for adapting operation over time. Examples of feedback 50 include memorability information and equivalency information, described more below. Assuming the aliaser 40 has the capability, it may modify its own operation for improved effectiveness over time. Such operation can be viewed as a form of machine learning. As a simplified example, the aliaser 40 may over time correlate memorability feedback with the length of words, the patterns of words (e.g., from parts of speech), or other characteristics (which may include confusability of words, measured by Levenshtein distance between their spellings, for example), and use the acquired correlation(s) to tailor its operation for greater effectiveness, e.g., by preferring shorter words or certain word patterns over others.

Figure 4:
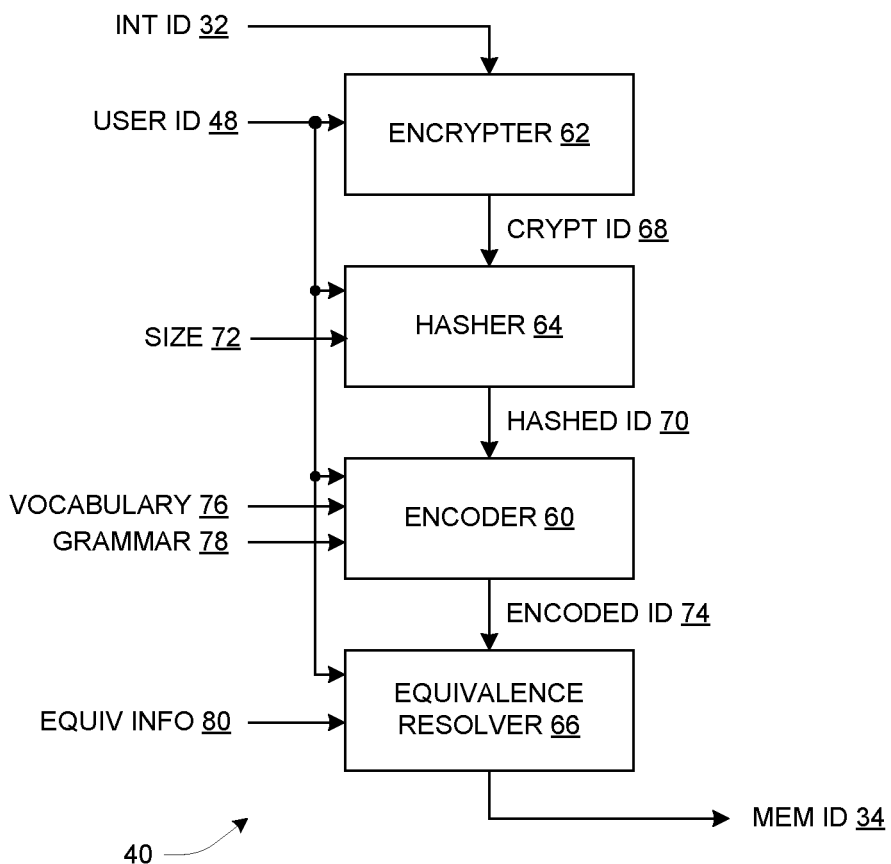
FIG. 4 is a block diagram of an aliaser.

FIG. 4 illustrates the aliaser 40. Core operation is provided by an encoder 60. Also shown are an encrypter 62, hasher 64, and equivalence resolver 66, any of which may be unnecessary and thus absent in some embodiments. In applications requiring enhanced security, the encrypter 62 may be employed to generate an encrypted form of the internal ID 32, shown as encrypted ID (CRYPT ID) 68. If the cardinality of the internal ID 32 is much larger than necessary for unique identification of cases, then the cardinality can be reduced through use of the hasher 64, which applies a hash function to generate a hashed ID 70. The hash function employed by the hasher 64 may be tailored based on size parameter(s) 72 specifying the size of the domain (number of cases) and/or the size of the range (practical limit on number of memorable IDs 34 required at a given time). The encoder 60 converts the hashed ID 70 to an encoded ID 74, which is a word sequence. Encoding is based on vocabulary 76 and optionally grammar 78 received from the dictionary/grammar component 44 (FIG. 3). The equivalence resolver 66 handles the above-mentioned 1:n and/or m:1 scenarios using equivalence information 80, e.g., by mapping multiple distinct internal IDs 32 to a single memorable ID 34. The equivalence information 80 is part of feedback 50 (FIG. 3). In other embodiments, the encrypter 62, hasher 64, encoder 60, and equivalence resolver 66 may be variously combined or applied in a different order than the configuration shown in FIG. 4.

Figure 5:
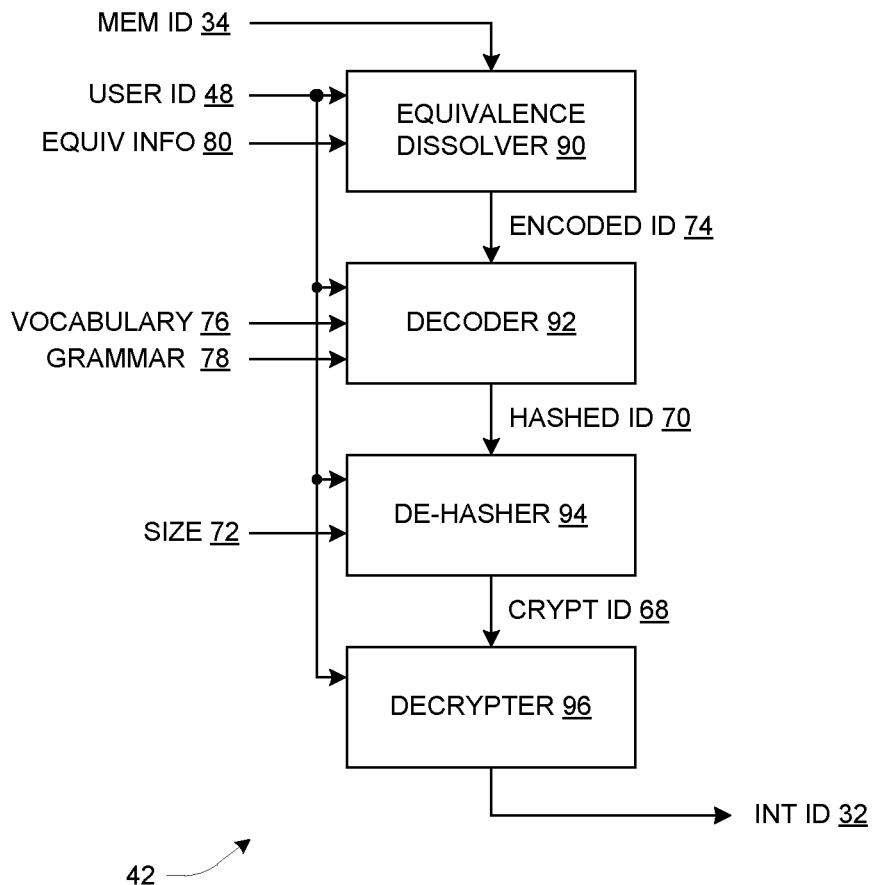
FIG. 5 is a block diagram of a de-aliaser.

FIG. 5 illustrates the de-aliaser 42, which as mentioned performs essentially the inverse operation from that of the aliaser 40. To that end it includes an equivalence dissolver 90, decoder 92, de-hasher 94, and decrypter 96. The equivalence dissolver 90 performs the inverse of the equivalence resolver 66, e.g., by generating distinct encoded IDs 74 for the same memorable ID 34 based on the equivalence information 80. The decoder 92 decodes the encoded ID 74, based on the vocabulary 78 and optional grammar 78, to generate a hashed ID 70. The de-hasher 94 generates an encrypted ID 68 from the hashed ID 70, and the decrypter 96 decrypts the encrypted ID 68 to generate the internal ID 32.

As noted above, the hash function used by hasher 64 and de-hasher 94 is reversible, i.e., the original input (e.g., encrypted ID 68) can be obtained from the hash function output (e.g., hashed ID 70). Reversible hash functions are generally well known and used outside of cryptography. In topology, reversible hash functions are called "injective functions"; in computer science, they are called "perfect hash functions". In the present application, compression is achieved by using the user-ID as a salt. One key consideration in this application is that a given single user would not need to remember all possible identifiers that could be generated. Indeed, a user handling and remembering a new case every second for a working lifetime of 50 years, at 50 weeks per year, 5 days per week, and 8 hours per day would only ever see 374,400,000 cases, which a sequence of three words from a small vocabulary of 750 words could represent. In one example, a minimal perfect hash function (i.e. a bijective function) could simply be a user-specific ordinal number of the (encrypted digitized) input case-identifier in an ordered list, for that user, of all the cases that the user has encountered so far, in the order in which the user encountered them.

The memorability information may be provided in the feedback 50 in a variety of ways. In one example, it may include an explicit indication from a user that a particular generated sequence is not sufficiently memorable. An alternative is to initially generate a few candidate memorable case-IDs for each input case-ID and let the user choose among these. Another alternative, more automated, is to measure how long a user takes to correctly find a memorable case-ID in a list, compared to the search time predicted by a model of the user's learning function, based on the user's search times for other memorable case-IDs, and when and how often the user has encountered each memorable case-ID. There is existing research for both search success and learning functions.

Figure 6:
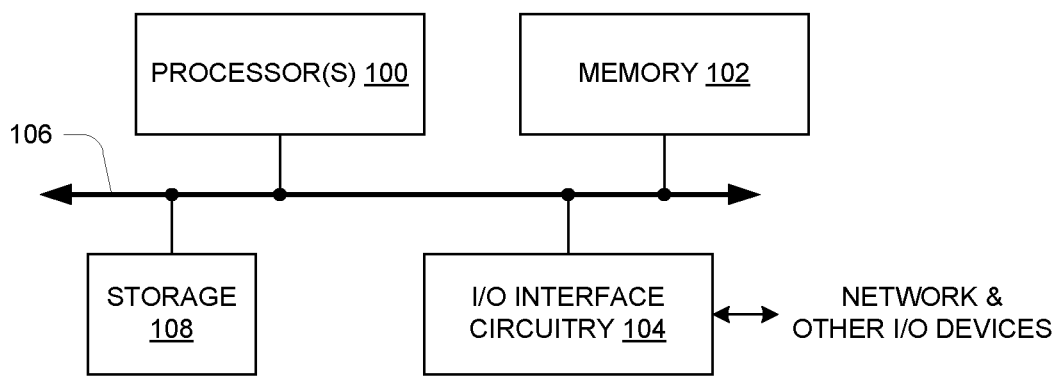
FIG. 6 is a block diagram of a computer from a hardware perspective.

FIG. 6 shows an example configuration of a physical computer from a computer hardware perspective. One or more such physical computers provide the hardware components of the case management system 10. The hardware includes one or more processors 100, memory 102, and interface circuitry 104 interconnected by data interconnections 106 such as one or more high-speed data buses. The interface circuitry 104 provides a hardware connection to external devices and/or networks, including for example the above-mentioned user display and other I/O devices. The processor(s) 100 with connected memory 102 may also be referred to as "processing circuitry" herein. There may also be local storage 108 such as a local-attached disk drive or Flash drive. In operation, the memory 102 stores data and instructions of system software (e.g., operating system) and one or more application programs which are executed by the processor(s) 100 to cause the hardware to function in a software-defined manner. Thus the computer hardware executing instructions of a case management application, for example, can be referred to as a case management circuit or case management component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Power of Method

Since adults fluent in English and similar languages typically have a working vocabulary of more than 15,000 dictionary words, an easily memorable sequence of just 3 arbitrary content words (e.g. "pumpkin whisky crisis") could distinguish more than 3 trillion ($3 \times 10^{12} = 1,000,000,000,000$) cases—more cases than a daunting sequence of 12 decimal digits such as a credit-card number (e.g. "6011 0009 9013 9424"); and more cases than 8 alphanumeric characters of gibberish (e.g. "K4JWQY9C"). Even with a typical 5-year old's working vocabulary of 1,000 dictionary words, a trillion cases could be distinguished by a still easily memorable sequence of just 4 words (e.g. "model cheese neck plastic").

The disclosed technique may of course be used in conjunction with other types of identifiers, even those whose cardinality alone might appear to require longer sequences of diminishing memorability. Examples include so-called MAC addresses (48 bits), EUI-64 identifiers (64 bits), IPv6 addresses (128 bits) and others. To fully cover a 128-bit identifier space might require longer word sequences, e.g. 10-word sequences, but in practice such full coverage will in many cases not be required, because only a subset of the entire space will be of interest at a given time. Thus a technique such as hashing may be used to reduce cardinality and the required length of the word sequence.

It should be noted that word sequence identifiers might be even more advantageous for users of logographic languages such as Chinese, for whom unfamiliar letters are even less memorable. On the other hand, for some polysynthetic languages, in which adverbs, adjectives, and nouns are usually incorporated into the verb and free-standing content words are rare, a sequence of content morphemes might be more appropriate than a sequence of content words, and when such a language has order restrictions, head-dependent agreement, fusion, or morphophonological changes, these may need to be taken into account in order for a morpheme sequence to be intelligible enough to be memorable.

Other Specifics and Alternatives

The following are additional or alternative features that may be incorporated into the disclosed technique:
1. ID hand-off and chaining
2. Customization to the task: domain size, range size
3. Adaptation to the user's vocabulary: language, dialect, vocabulary size, individual words or morphemes; dyslexia, squeamishness, emotional content
4. Adaptation to the user's memory based on recognition timing and confusion rates.
5. Isomorphism; ambiguity
6. User ID incorporated as a "salt" for the encryption and/or hashing
7. User ID selects a user-specific hash table for reversibility
8. Rendering as sign-language or audio While various embodiments of the invention have been particularly shown and described, it will be understood by those skilled in the art that various changes in form and details may be made therein without departing from the spirit and scope of the invention as defined by the appended claims.

What is claimed is:

1. A method of operating a case management system having a case database storing case records in association with respective internal case identifiers, comprising:

automatically generating memorable case identifiers and providing them to users of the case management system for use in identifying respective case records, the memorable case identifiers being generated by encoding the internal case identifiers along with respective user identifiers as respective sequences of words of a natural language of the users according to an encoding function, the sequences of words forming the memorable case identifiers; and retrieving case records from the case database and providing the case records to the users based on memorable case identifiers received from the users, the case records being retrieved by decoding received memorable case identifiers into respective internal case identifiers and accessing the case database using the respective internal case identifiers from the decoding; and receiving and using feedback information to modify future operation based on past operation, the feedback information including memorability information indicating a level of memorability of memorable case identifiers that have been automatically generated, the memorability information used to alter the encoding operation to prefer words having characteristics correlated with higher memorability as identified by the memorability information.

2. The method of claim 1, wherein the case records are further associated with respective obscure identifiers visible to and used by the users of the case management system to identify respective case records to the case management system, and wherein automatically generating memorable case identifiers includes capturing obscure identifiers provided by the users and translating captured obscure identifiers to corresponding internal case identifiers for use in the encoding.

3. The method of claim 2, wherein the obscure case identifiers are graphical geometric patterns of a graphical encoding scheme, and wherein capturing obscure identifiers includes machine scanning of physical instances of the graphical geometric patterns.

4. The method of claim 1, wherein:

automatically generating a memorable case identifier includes encrypting a respective internal case identifier and a respective user identifier together to form an encrypted identifier, the encrypted identifier being used in the encoding to generate the corresponding memorable case identifier; and retrieving a case record includes first decoding a respective received memorable case identifier into a respective encrypted identifier and then decrypting the encrypted identifier to generate the respective internal identifier used to access the case database.

5. The method of claim 1, wherein:
automatically generating a memorable case identifier includes hashing a respective internal case identifier and a respective user identifier together to form a hashed identifier, the hashed identifier being used in the encoding to generate the corresponding memorable case identifier; and
retrieving a case record includes first decoding a respective received memorable case identifier into a respective hashed identifier and then de-hashing the hashed identifier to generate the respective internal identifier used to access the case database.

6. The method of claim 5, wherein hashing and de-hashing includes receiving size parameters and tailoring the hashing and de-hashing according to the size parameters, the size parameters specifying respective domain and range sizes, a domain size including a total cardinality of the internal case identifiers, a range size being a smaller limit on a number of memorable identifiers in use at a given time.

7. The method of claim 1, further including maintaining a dictionary containing a vocabulary of words to be used in the sequences of words forming the memorable case identifiers, and wherein the encoding performed in automatically generating memorable case identifiers includes obtaining words from the dictionary.

8. The method of claim 7, further including maintaining a grammar containing rules for generating the sequences of words forming the memorable case identifiers, and wherein the encoding performed in automatically generating memorable case identifiers is performed according to the rules of the grammar.

9. The method of claim 1, wherein:
automatically generating a memorable case identifier includes resolving equivalence of multiple internal case identifiers to a single memorable case identifier and/or resolving equivalence of a single case identifier to multiple memorable case identifiers.

10. The method of claim 9, wherein equivalence of multiple internal case identifiers to a single memorable case identifier occurs in a context of accessing groups of cases identified by respective single memorable case identifiers.

11. The method of claim 9, wherein equivalence of multiple memorable case identifiers to a single internal case identifier occurs in a context of information compartmentalization wherein distinct users access a single case by respective distinct memorable case identifiers and have no visibility of the single internal case identifier of the case.

12. A computer system including computer hardware executing computer software to constitute a case management system, comprising:
a case database storing case records in association with respective internal case identifiers;
an aliaser configured and operative to automatically generate memorable case identifiers and provide them to users of the case management system for use in identifying respective case records, the memorable case identifiers being generated by encoding the internal case identifiers along with respective user identifiers as respective sequences of words of a natural language of the users according to an encoding function, the sequences of words forming the memorable case identifiers; and a de-aliaser configured and operative as part of retrieving case records from the case database and providing the case records to the users based on memorable case identifiers received from the users, the de-aliaser decoding received memorable case identifiers into respective internal case identifiers used to access the case database to obtain the corresponding case records; and wherein the aliaser is further configured and operative to receive and use feedback information to modify future operation based on past operation, the feedback information including memorability information indicating a level of memorability of memorable case identifiers that have been automatically generated, the memorability information used to alter the encoding operation to prefer words having characteristics correlated with higher memorability as identified by the memorability information.

13. The computer system of claim 12, wherein the case records are further associated with respective obscure identifiers visible to and used by the users of the case management system to identify respective case records to the case management system, and wherein automatically generating memorable case identifiers includes capturing obscure identifiers provided by the users and translating captured obscure identifiers to corresponding internal case identifiers for use in the encoding.

14. The computer system of claim 13, wherein the obscure case identifiers are graphical geometric patterns of a graphical encoding scheme, and wherein capturing obscure identifiers includes machine scanning of physical instances of the graphical geometric patterns.

15. The computer system of claim 12, wherein:
automatically generating a memorable case identifier includes encrypting a respective internal case identifier and a respective user identifier together to form an encrypted identifier, the encrypted identifier being used in the encoding to generate the corresponding memorable case identifier; and
retrieving a case record includes first decoding a respective received memorable case identifier into a respective encrypted identifier and then decrypting the encrypted identifier to generate the respective internal identifier used to access the case database.

16. The computer system of claim 12, wherein:
automatically generating a memorable case identifier includes hashing a respective internal case identifier and a respective user identifier together to form a hashed identifier, the hashed identifier being used in the encoding to generate the corresponding memorable case identifier; and
retrieving a case record includes first decoding a respective received memorable case identifier into a respective hashed identifier and then de-hashing the hashed identifier to generate the respective internal identifier used to access the case database.

17. The computer system of claim 12, further including a dictionary containing a vocabulary of words to be used in the sequences of words forming the memorable case identifiers, and wherein the encoding performed in automatically generating memorable case identifiers includes obtaining words from the dictionary.

18. The computer system of claim 12, wherein:
automatically generating a memorable case identifier includes resolving equivalence of multiple internal case identifiers to a single memorable case identifier and/or resolving equivalence of a single case identifier to multiple memorable case identifiers.

* * * * *